March 30, 1954 C. E. AVERY 2,673,716
BIT
Filed Sept. 2, 1950

INVENTOR.
CLYDE E. AVERY
BY
James B. Christie
ATTORNEY

Patented Mar. 30, 1954

2,673,716

UNITED STATES PATENT OFFICE 2,673,716

BIT

Clyde E. Avery, Pasadena, Calif.

Application September 2, 1950, Serial No. 183,014

2 Claims. (Cl. 255—64)

This invention relates to percussion drills for drilling rock and hard masonry or concrete. The invention contemplates improvements in the design and fabrication of drills of this type directed to improvement in efficiency and durability.

A percussion drill is operated by a rapid succession of sharp blows frequently accompanied by a relatively slow rotary motion through an arc of something less than about 180°. This method of operation is contrasted with that of the rotary drills which are rotated at high speeds and generally in the absence of any axial oscillation or impact. As a result of its method of use, a percussion drill must be extremely rugged at its cutting end to withstand the severe jarring, and even the sturdiest drill requires frequent resharpening because of the blunting effect of repeated axial impact with hard rock or other material being drilled.

I have now discovered that a percussion drill provided with a carbide tip or carbide teeth, as for example tungsten titanium carbide, is more effective and more durable than the conventional all metal percussion drill. Moreover, by proper design of the carbide tip as hereinafter explained, resharpening may be greatly facilitated by effecting an appreciable reduction in the number of facets requiring separate grinding.

In one embodiment, the invention contemplates a percussion drill comprising a shank, at least three radially disposed carbide teeth affixed to and extending axially from one end of the shank, and a separate flute formed in the shank between adjoining teeth and extending along the shank toward the opposite end thereof. The flutes formed between the teeth and extending along the shank permit escape of ground or crushed material as the drill penetrates.

The carbide teeth, which should be at least three in number and preferably four or more, may be separate carbide elements suitably affixed to the end of the shank, but in preferred practice are integrally formed as a part of a unitary carbide tip. Additionally, and as more fully explained in conjunction with the drawing, such an integral tip is preferably cylindrical in shape at the point of abutment with the shank with the outer end of the tip being pyramidal in shape and having its apex centered on a projection of the longitudinal axis of the shank. In a tip of this nature several teeth or radial legs are formed by a like number of even angularly spaced flutes traversing the tip axially and aligned with like flutes formed on the shank. This type of construction provides a considerable saving in the cost of resharpening the drill in that the radial teeth are formed by the inclined planes of the pyramidal end of the tip being of the same number as the teeth. For example, if the tip terminates in a four-sided pyramid and is provided with four equal angularly spaced axial flutes, four radially projecting legs will be formed with the crest of the adjoining pyramidal sides being centrally aligned along the legs to form teeth or cutting edges along the outer exposed edge of each of the legs. With this design, four grinding operations will sharpen all four of the teeth, whereas in the conventional four-toothed percussion drill each tooth is independently ground and hence it requires eight grinding operations to grind the two facets of each tooth. Moreover, the drill may be reground without loss of guage and in this respect further differs from conventional percussion drills.

The invention also contemplates a method of fabricating a drill of the type described above wherein one or more recesses are provided in one of the elements, that is either in the shank or the tip or the several teeth if an integral tip is not used, and corresponding projections are formed on the other element or elements, the recesses and projections being oriented to project into the corresponding recess or recesses when the carbide and shank are axially aligned. If a single tip having integrally formed teeth is employed, one recess and one corresponding projection in the shank and tip will generally suffice. If separate carbide teeth are employed, the shank is conveniently provided with a separate recess on its end face to receive respectively a projection formed in each tooth.

The method of fabrication comprises interposing between the tip and the shank a piece of fusible metal, mounting the tip on the shank with the projection on one extending into the recess in the other so as to substantially enclose or cover the fusible material, and heating the shank to melt the fusible material by conduction through the shank. The tip is, in this case, used in the sense of either a single element or a plurality of separate teeth. The fusible material may take the form of a pellet inserted in the recess before assembly of the tip and shank. Alternatively, a sheet of fusible material having the general configuration of the abutting faces of the shank and tip and having an opening therein corresponding in shape with the recess in one of the members and aligned therewith when the sheet is positioned, may be used. The tip is then mounted on the shank with the projection on one extending into the recess in the other through the opening in the sheet of fusible material, and as before the shank is heated to melt the fusible material by conduction through the shank.

The invention will be clearly understood from the following description thereof taken in conjunction with the accompanying drawing wherein.

Figure 1:
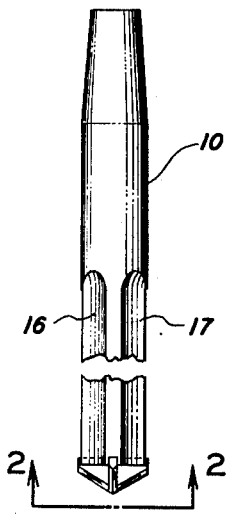
Fig. 1 is an elevation of a drill in accordance with the invention and in which the several carbide teeth are not integrally formed.
Figure 2:
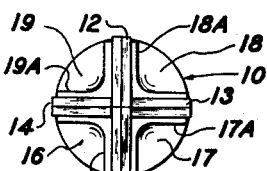
Fig. 2 is an enlarged end view taken on the line 2—2 of Fig. 1.
Figure 3:
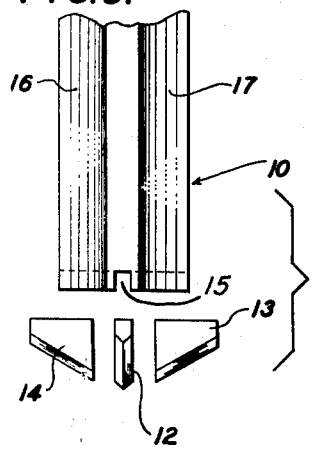
Fig. 3 is an enlarged exploded elevation of the drill of Fig. 1.

Referring to Figs. 1, 2 and 3 of the drawing, the drill there shown comprises a shank 10 having three carbide elements 12, 13, 14 mounted in an end face thereof and forming four equal angularly spaced radially extending teeth. The shank 10 is fluted at 16, 17, 18 and 19 forming at one end radial lands 16A, 17A, 18A, 19A in which the aforementioned carbide elements 12, 13 and 14 are mounted. The element 12 is pentagonal in elevation and extends diametrically across the end of the shank along lands 18A and 16A. The carbide elements 13 and 14 are substantially trapezoidal in elevation and are mounted in the lands 17A, 19A, respectively, extending from the outer periphery of the shank to abut against opposite side faces of the element 12.

The several carbide elements 12, 13 and 14 are mounted in slots 15 formed in the respective lands and are arranged so that the apexes thereof converge away from the end of the shank at a point generally coinciding with an extension of the longitudinal axis of the shank. Preferably the several teeth protrude slightly, say from about 0.016 to 0.090 inch, beyond the side of the shank with each tooth terminating the same distance from the axis of rotation all within manufacturing tolerances.

In the drawing the exposed outer edges of the several carbide elements are beveled to form planes defining dihedral angles the apexes of which comprise the cutting edges of the elements. The adjacent facets of the adjacent cutting elements may be beveled on a single plane as more particularly described hereinafter, or may be beveled on separate planes, the latter construction being that illustrated in Figures 1 to 3 of the drawing. In the bit of Figs. 1 to 3, eight grinding operations are required for resharpening the four teeth, and in this respect this drill suffers the same disadvantage as the conventional all metal percussion drill. Grinding may be minimized by forming the opposing facets of adjoining teeth in the same plane, as will become apparent.

Figure 4:
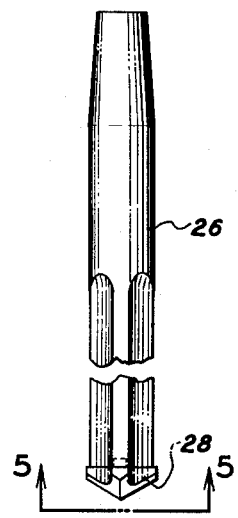
Fig. 4 is an elevation of a drill in accordance with the invention having a single carbide tip with integrally formed teeth.
Figure 5:
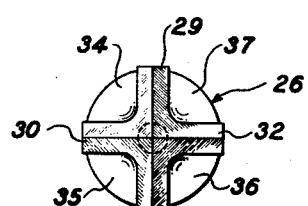
Fig. 5 is an enlarged end view taken on the line 5—5 of Fig. 4.
Figure 6:
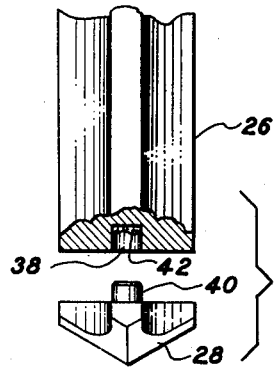
Fig. 6 is an enlarged exploded elevation of the bit of Fig. 4 illustrating one means of affixing the carbide tip to the shank.

A preferred embodiment of the drill of the invention is shown in Figs. 4 to 6 and includes a shank 26 having a single carbide tip 28. The tip has four integral and radially extending legs or lands 29, 30, 31, 32 formed by equal angularly spaced axial flutes formed in the side walls of the tip and axially aligned with flutes 34, 35, 36, 37 formed in the shank and opening at the proximate end of the shank. The outer end of the tip 28 is pyramidal in shape, in this case a four-sided pyramid, with the adjoining edges of the several sides being radially centered on the legs 29, 30, 31 and 32. This results in a beveled cutting edge extending the length of each leg with the adjoining facets of proximate legs being beveled in the same plane and the several cutting edges converging at the pyramidal apex. The result of this design is that all four of the teeth formed by the beveled edges of the legs 29, 30, etc., may be sharpened in four grinding operations since only four faces need be ground. As in the foregoing embodiment the several legs of the tip preferably extend radially beyond the side of the shank and to about the same extent mentioned above. The radial extension of the cutting edges beyond the shank circumference prevents the drill from binding in the hole. This constitutes another distinguishing advantage of the present drill over a conventional percussion drill in which the cutting edges are formed integrally with the shank and do not overhang the shank.

Fig. 6, which is an exploded view of the bit of Fig. 4, shows one way of affixing the carbide tip to the shank in accordance with the invention. As shown in this figure, the shank 26 has a central recess 38 in its abutting face. The carbide tip 28 has a projection 40 extending from its adjoining face, the projection being of substantially the same dimensions as the recess 38 in the shank. Generally the recess is made slightly larger than the projection, the slope taking care of reasonable manufacturing tolerances. To assemble the drill a pellet or plug 42 of a fusible material, such as silver solder, is inserted in the recess, the tip 28 is positioned on the end of the shank with the projection 40 extending into the recess 38 exerting a pressure on the fusible plug 42 therein, and heating the shank 26 to melt the fusible material by conduction through the shank. Under the influence of the compressive force exerted by the projection 40, the fusible material migrates around the projection and between the legs of the carbide tip and the corresponding lands of the shank.

Figure 7:
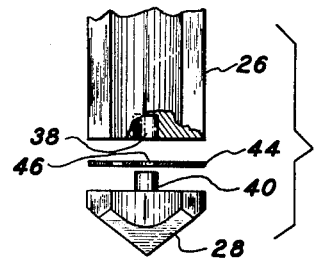
Fig. 7 is an exploded view of a bit as shown in Fig. 4 showing another means of affixing a carbide tip to the shank.

Another method of affixing the tip 28 to the shank 26 is illustrated in Fig. 7. Again the tip 28 has the projection 40 adapted to fit in the recess 38 in the end face of the shank 26. In this embodiment a sheet 44 of a fusible material, such as silver solder, shaped generally to conform to the shapes of the adjoining faces of the shank and tip and having a central opening 46, is disposed between the tip and the shank. The tip 28 is placed on the shank with the projection 40 extending through the opening 46 in the sheet 44 and into the recess 38. Heat is then applied to the shank 26 to melt the fusible sheet 44 by conduction through the shank and to bond the several legs of the carbide tip to the corresponding lands formed at the end of the shank by the flutes of the shank.

Figure 8:
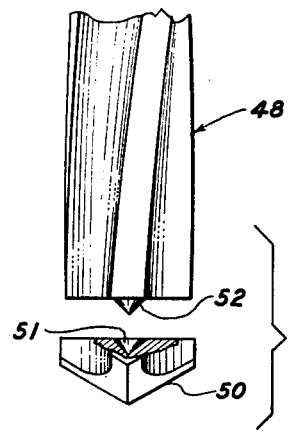
Fig. 8 is an exploded elevation of a bit similar to that shown in Figs. 4 to 6 and showing an alternative construction of the shank and tip.

Still another construction is shown in the partial sectional elevation of Fig. 8. The drill there shown includes a shank 48 and a single carbide tip 50 essentially similar to the tip 28 shown in Figs. 4 to 7 and differing therefrom in the provision of a recess 51 in the face of the tip abutting the shank 48. The shank 48 is provided with a corresponding projection 52 adapted to extend into the recess 51 when the tip and shank are in axial alignment. In the embodiment of Fig. 8, the tip and shank may be bonded together either in the manner shown in Fig. 6 or the manner illustrated in Fig. 7 or in any other manner hereinafter devised, the particular mode of joining the tip and shank above described being illustrative only of preferred practice but not limiting the invention to such procedures. If desired, the recess and corresponding projection in the adjoining elements of the bit may be used for registration as well as axial alignment. However, I have found that generally the accuracy required in forming the recess and respective projection so as to function for this purpose renders such procedure impractical.

The invention as so far described with relation to the drawing has been limited to a drill having four radially arranged cutting elements. Although four constitutes a presently preferred number of cutting elements, any number may be employed with the only limitation that at least three cutting elements are required. Similarly, the drawing shows a drill shank with four flutes and a carbide tip, as for example as shown in Fig. 4, with four similar aligned flutes. The number of flutes is determined solely by the number of radial cutting elements, one flute being required between adjacent pairs of teeth and hence any variation in the number of teeth from the four shown will require similar variation in the number of flutes. Moreover, the flutes in the shank may extend along the shank parallel to its rotary axis or may spiral around the shank as shown in Fig. 8, provided only that each separate flute makes less than one complete revolution around the shank.

I claim:

1. A percussion drill comprising a shank and three individual carbide teeth permanently affixed by soldering means to and extending from one end of the shank, one tooth being pentagonal with two equal sides perpendicular to the side abutting the shank, the distance between these equal sides being approximately equal to the diameter of the shank, the other two sides being equal in length to each other and forming an angle between them of less than 180°, these latter sides being shaped on their dimension of thickness by planes to form dihedral angles whose edges intersect at a point on the axis-extended of the shank, the other two teeth being trapezoidal and congruent to each other, the longer parallel side abutting the pentagonal tooth, the planes of the trapezoidal teeth being perpendicular to the plane of the pentagonal tooth, the side farthest from the shank being shaped on its dimension of thickness by planes to form a dihedral angle whose edge forms a continuation of an edge of a dihedral angle on the pentagonal tooth, the shank having separate flutes on its periphery between adjacent teeth which extend longitudinally along the shank.

2. A percussion drill comprising a shank and three individual carbide teeth permanently affixed by soldering means into a cruciform slot centered in the end of the shank and extending from one end of the shank, one tooth being pentagonal with two equal sides perpendicular to the side abutting the shank, the distance between these equal sides being approximately equal to the diameter of the shank, the other two sides being equal in length to each other and forming an angle between them of less than 180°, these latter sides being shaped on their dimension of thickness by planes to form dihedral angles whose edges intersect at a point on the axis-extended of the shank, the other two teeth being trapezoidal and congruent to each other, the longer parallel side abutting the pentagonal tooth, the planes of the trapezoidal teeth being perpendicular to the plane of the pentagonal tooth, the side farthest from the shank being shaped on its dimension of thickness by planes to form a dihedral angle whose edge forms a continuation of an edge of a dihedral angle on the pentagonal tooth, the shank having separate flutes on its periphery between adjacent teeth which extend longitudinally along the shank.

CLYDE E. AVERY.

References Cited in the file of this patent

UNITED STATES PATENTS

| Number | Name | Date |
|---|---|---|
| 455,963 | Farrar | July 14, 1891 |
| 836,845 | Whitcomb | Nov. 27, 1906 |
| 993,972 | English | May 30, 1911 |
| 1,136,987 | Wakfer | Apr. 27, 1915 |
| 1,887,372 | Emmons | Nov. 8, 1932 |
| 2,094,495 | Robinson et al. | Sept. 28, 1937 |
| 2,208,985 | Janosko | July 23, 1940 |
| 2,216,361 | Twiss | Oct. 1, 1940 |
| 2,301,915 | Harrington | Nov. 17, 1942 |
| 2,354,656 | Annesley | Aug. 1, 1944 |

FOREIGN PATENTS

| Number | Country | Date |
|---|---|---|
| 549,757 | Great Britain | Dec. 4, 1942 |